(12) United States Patent
Suzuki

(10) Patent No.: US 9,994,220 B2
(45) Date of Patent: Jun. 12, 2018

(54) TARGET VEHICLE SPEED GENERATING DEVICE AND DRIVING CONTROL DEVICE

(71) Applicant: Nissan Motor Co., Ltd., Yokohama-shi, Kanagawa (JP)

(72) Inventor: Yasuhiro Suzuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days. days.

(21) Appl. No.: 15/538,558

(22) PCT Filed: Jun. 30, 2015

(86) PCT No.: PCT/IB2015/001076
§ 371 (c)(1),
(2) Date: Jun. 21, 2017

(87) PCT Pub. No.: WO2016/110729
PCT Pub. Date: Jul. 14, 2016

(65) Prior Publication Data
US 2017/0349178 A1    Dec. 7, 2017

Related U.S. Application Data

(60) Provisional application No. 62/099,646, filed on Jan. 5, 2015.

(51) Int. Cl.
*B60W 30/16* (2012.01)

(52) U.S. Cl.
CPC ....... *B60W 30/162* (2013.01); *B60W 2420/52* (2013.01); *B60W 2520/105* (2013.01); *B60W 2550/10* (2013.01); *B60W 2550/402* (2013.01); *B60W 2720/106* (2013.01)

(58) Field of Classification Search
CPC combination set(s) only.
See application file for complete search history.

(56) References Cited

U.S. PATENT DOCUMENTS

2009/0164080 A1    6/2009  Kurata et al.
2015/0239472 A1*   8/2015  Sudou ................. B60W 30/16
                                                           702/96

FOREIGN PATENT DOCUMENTS

| JP | 6-229279 A   | 8/1994  |
| JP | 9-288797 A   | 11/1997 |
| JP | 10-31066 A   | 2/1998  |
| JP | 2004-90712 A | 3/2004  |
| JP | 2004-239792 A| 8/2004  |
| JP | 2005-306240 A| 11/2005 |
| JP | 2007-127517 A| 5/2007  |
| JP | 2009-262895 A| 11/2009 |

(Continued)

*Primary Examiner* — Anne M Antonucci
*Assistant Examiner* — Renee LaRose
(74) *Attorney, Agent, or Firm* — Global IP Counselors, LLP

(57) ABSTRACT

A target vehicle speed generating device basically includes a determination unit and a correction unit. The determination unit determines whether or not a sudden change point is present in the target vehicle speed contained in the corrects the target vehicle speed so as to eliminate the sudden change point upon determining that the sudden change point is present by the determination unit. The sudden change point corresponds to a point at which acceleration changes in excess of a predetermined condition.

13 Claims, 8 Drawing Sheets

(56) References Cited

FOREIGN PATENT DOCUMENTS

| JP | 2010-264841 A | 11/2010 |
|---|---|---|
| JP | 2011-240816 A | 12/2011 |
| JP | 2014-108652 A | 6/2014 |

\* cited by examiner

TARGET VEHICLE SPEED GENERATING DEVICE AND DRIVING CONTROL DEVICE

CROSS-REFERENCE TO RELATED APPLICATIONS

This application is a U.S. National stage application of International Application No. PCT/IB2015/001076, filed Jun. 30, 2015.

BACKGROUND

Field of the Invention

The present invention relates to a target vehicle speed generating device and a driving control device. More specifically, the present invention relates to a target vehicle speed generating device that generates a target vehicle speed for controlling the driving of a vehicle, and a driving control device that controls the autonomous driving of a vehicle.

Background Information

Attempts are being made to develop an autonomous driving control device that is capable of autonomously controlling a vehicle from a departure point to a destination (for example refer to Japanese Laid-Open Patent Publication No. 2011-240816-Patent Document 1). In this type of autonomous driving control device, for example, a course (pathway) of a vehicle from a departure point to a destination is calculated using a well-known navigation technique, and lanes and obstacles on the course are detected using sensing technology, such as a radar sensor, an image sensor, etc. The autonomous driving control device causes the vehicle to driving autonomously along a course based on the detected information.

SUMMARY

In such an autonomous driving control, if a stop instruction or a deceleration instruction is output while the vehicle is accelerating, causing a sudden switch to deceleration, the behavior of the vehicle is suddenly greatly changed, and there is the possibility that the user will feel discomfort in the ride quality. Additionally, there is the possibility that the user will also feel discomfort when an acceleration instruction is output while the vehicle is decelerating, causing a sudden switch to acceleration.

An object of the present invention is to provide a driving control device that reduces discomfort that is felt by the user when controlling a vehicle during such autonomous driving.

The target vehicle speed generating device of a vehicle as one embodiment of the present invention comprises a determination unit and a correction unit. The determination unit determines whether or not a sudden change point, at which the acceleration changes in excess of a predetermined condition, is present in the target vehicle speed contained in the target pathway information of the vehicle, which is set in advance. The correction unit corrects the target vehicle speed so as to eliminate the sudden change point, upon determining that a sudden change point is present by the determination unit.

The driving control device, as another embodiment of the present invention, is a driving control device of a vehicle that has a distance measurement unit that measures the distance to an object to be measured, comprising an acceleration determination unit and a detection distance setting unit. The acceleration determination unit determines whether or not the acceleration of the vehicle is greater than a predetermined acceleration threshold value. The detection distance setting unit increases the detection distance of the distance measurement unit upon determining that the acceleration of the vehicle is greater than the predetermined acceleration threshold value by the acceleration determination unit.

According to the present invention, it becomes possible to provide a target speed generating device and a driving control device that reduce discomfort that is felt by the user when controlling the autonomous driving of a vehicle.

DETAILED DESCRIPTION OF THE EMBODIMENTS

First Embodiment

The driving control device 10 according to the first embodiment will be described with reference to FIG. 1-FIG. 6.

Figure 1:
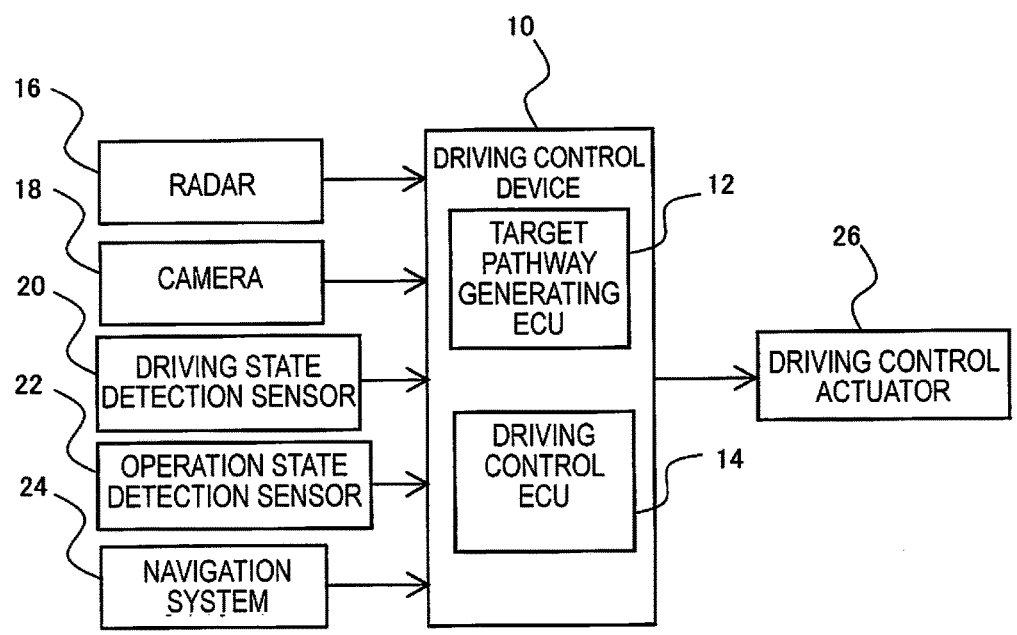
FIG. 1 is a block diagram illustrating the driving control device according to a first embodiment.

FIG. 1 is a block diagram illustrating the driving control device 10 according to an embodiment of the invention. The driving control device 10 is a device mounted in a vehicle, and a device for autonomously controlling driving of the vehicle along a course (pathway) from a departure point to a destination, which is calculated using navigation technology, or the like. In particular, the driving control device 10 divides the course from the departure point to the destination into predetermined sections, updates a target pathway that shows the vehicle's driving trajectory and the vehicle's behavior (for example, vehicle speed, acceleration, steering angle, etc.) for each section, and controls the driving of the vehicle based on the target pathway.

The driving control device 10 comprises a target pathway generating ECU (Electronic Control Unit) 12 and a driving control ECU 14, as illustrated in FIG. 1. In addition, radar 16 (distance measurement unit), a camera 18, a driving state detection sensor 20, an operation state detection sensor 22, a navigation system 24, and the like, are electrically connected to the driving control device 10, as illustrated in FIG. 1. Furthermore, a driving control actuator 26 is electrically connected to the driving control device 10. The driving control device 10 can be appropriately connected to other well-known configurations, such as a communication unit for carrying out inter-vehicle communication.

Figure 2:
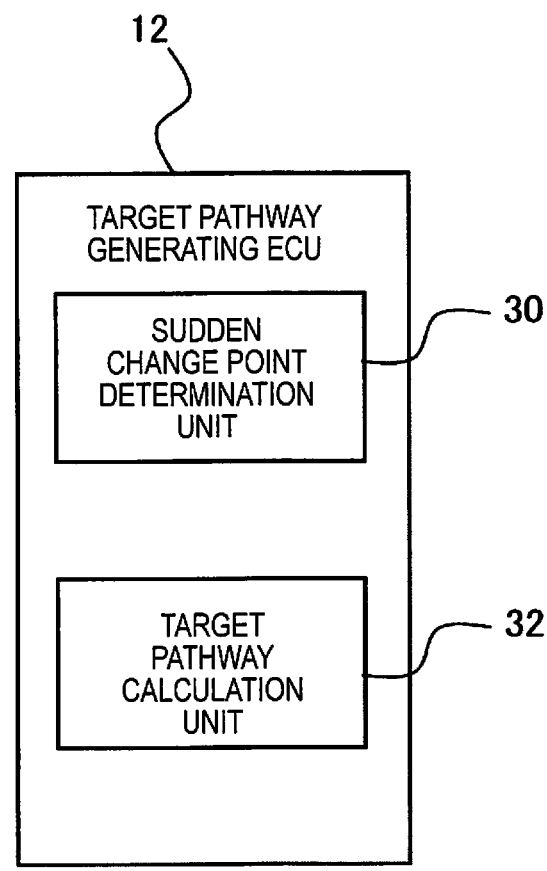
FIG. 2 is a block diagram illustrating the target pathway generating ECU of the driving control device.

The target pathway generating ECU 12 and the driving control ECU 14 are each electronic control units comprises a CPU (Central Processing Unit) and a memory, such as a ROM (Read Only Memory), a RAM (Random Access Memory), and the like. The target pathway generating ECU 12 acquires map information and a course from a departure point to a destination searched by the navigation system 24, and calculates a target pathway that represents the driving trajectory of the vehicle and the behavior of the vehicle for each predetermined section that is set on the course, as illustrated in FIG. 2. The driving control ECU 14 controls the driving of the vehicle based on the target pathway generated by the target pathway generating ECU 12. For example, the driving control ECU 14 calculates the driving control amount of the host vehicle, such as acceleration/deceleration and the steering angle, based on the target pathway generated by the target pathway generating ECU 12, as well as data from the radar 16, the camera 18, the driving state detection sensor 20, the operation state detection sensor 22, and the navigation system 24. Furthermore, the driving control ECU 14 controls the driving control actuator 26 based on the driving control amount. In FIG. 1, the target pathway generating ECU 12 and the driving control ECU 14 are described as independent ECUs, but the two can be integrally configured as appropriate.

The radar 16 detects the presence, position (distance and angle from the vehicle), and speed, as well as the relative speed with respect to the host vehicle, of a vehicle, a motorcycle, a bicycle, a pedestrian, and the like, surrounding the host vehicle. The radar 16 comprises, for example, a laser radar, a millimeter wave radar, an ultrasonic radar, or the like. The radar 16 outputs the detected data to the driving control device 10. Since a well-known radar can be appropriately used as the radar 16, a detailed description of the configuration will be omitted.

The camera 18 is, for example, attached to the front or the side of the host vehicle, and captures an image of the host vehicle's surroundings. For example, the camera 18 captures road section lines and obstacles on the course. The camera 18 comprises an imaging element, such as a CCD (Charge Coupled Device) or CMOS (Complementary Metal-oxide Semiconductor). The camera 18 outputs the captured image to the driving control device 10. Since a well-known camera can be appropriately used as the camera 18, a detailed description of the configuration will be omitted.

The driving state sensor 20 detects the driving state (for example, vehicle speed, acceleration, yaw angle, etc.) of the host vehicle. The driving state sensor 20 has, for example, a wheel speed sensor provided for each wheel of the host vehicle, and detects the driving state of the host vehicle, such as the vehicle speed, by measuring the wheel speed. The driving state sensor 20 outputs the detected driving state of the host vehicle to the driving control device 10. Since a well-known vehicle speed sensor, acceleration sensor, and yaw angle sensor can be used as the driving state sensor 20, a detailed description of the configuration will be omitted.

The operation state detection sensor 22 detects the operation state of the host vehicle. Specifically, the operation state detection sensor 22 detects the accelerator operation, the brake operation, the steering wheel operation (steering), and the like, of a user that rides in the vehicle (hereinafter referred to as driver). The operation state sensor 22 outputs the detected operation state of the host vehicle to the driving control device 10. Since a well-known accelerator operation sensor, brake operation sensor, and steering sensor can be used as the operation state sensor 22, a detailed description of the configuration will be omitted.

The navigation system 24 receives GPS signals from a GPS (Global Positioning System) satellite. In addition, the navigation system 24 can comprise a gyroscope that detects the magnitude of a rotational movement applied to the vehicle, an acceleration sensor that detects the driving distance of the vehicle from acceleration in three axial directions, and the like, and a geomagnetic sensor that detects the driving direction of the vehicle from geomagnetism, or the like. The navigation system 24 stores map information in a storage medium, such as a hard disk. This map information contains information relating to the locations and shapes of roads and intersections, and to traffic rules, including traffic signs, signals, and the like. In addition, map information can define the drivable area of the vehicle within the lane on the road. The navigation system 24 detects the position of the host vehicle and the orientation with respect to the road, based on the map information and GPS signals from a GPS satellite. The navigation system 24 searches a course from the departure point to the destination, according to inputs of the departure point (or the current position) and the destination, and carries out pathway guidance to the destination, using the searched course and the positional information of the host vehicle. In addition, the navigation system 24 outputs the searched course to the driving control device 10 together with the map information. Since a well-known navigation system can be appropriately used as the navigation system 24, a detailed description of the configuration will be omitted.

The driving control actuator 26 comprises an acceleration/deceleration actuator for accelerating and decelerating the host vehicle, and a steering actuator that adjusts the steering angle. The driving control actuator 26 controls the driving of the host vehicle by causing the acceleration/deceleration actuator and the steering actuator to operate, based on the driving control amount that is transmitted from the driving control ECU 14.

Next, the generation of a target pathway by the target pathway generating ECU 12 will be described, with reference to FIG. 2-FIG. 6. The target pathway generating ECU 12 comprises a generation method determination unit 30 and a target pathway calculation unit 32 (correction unit), as illustrated in FIG. 2.

Figure 3:
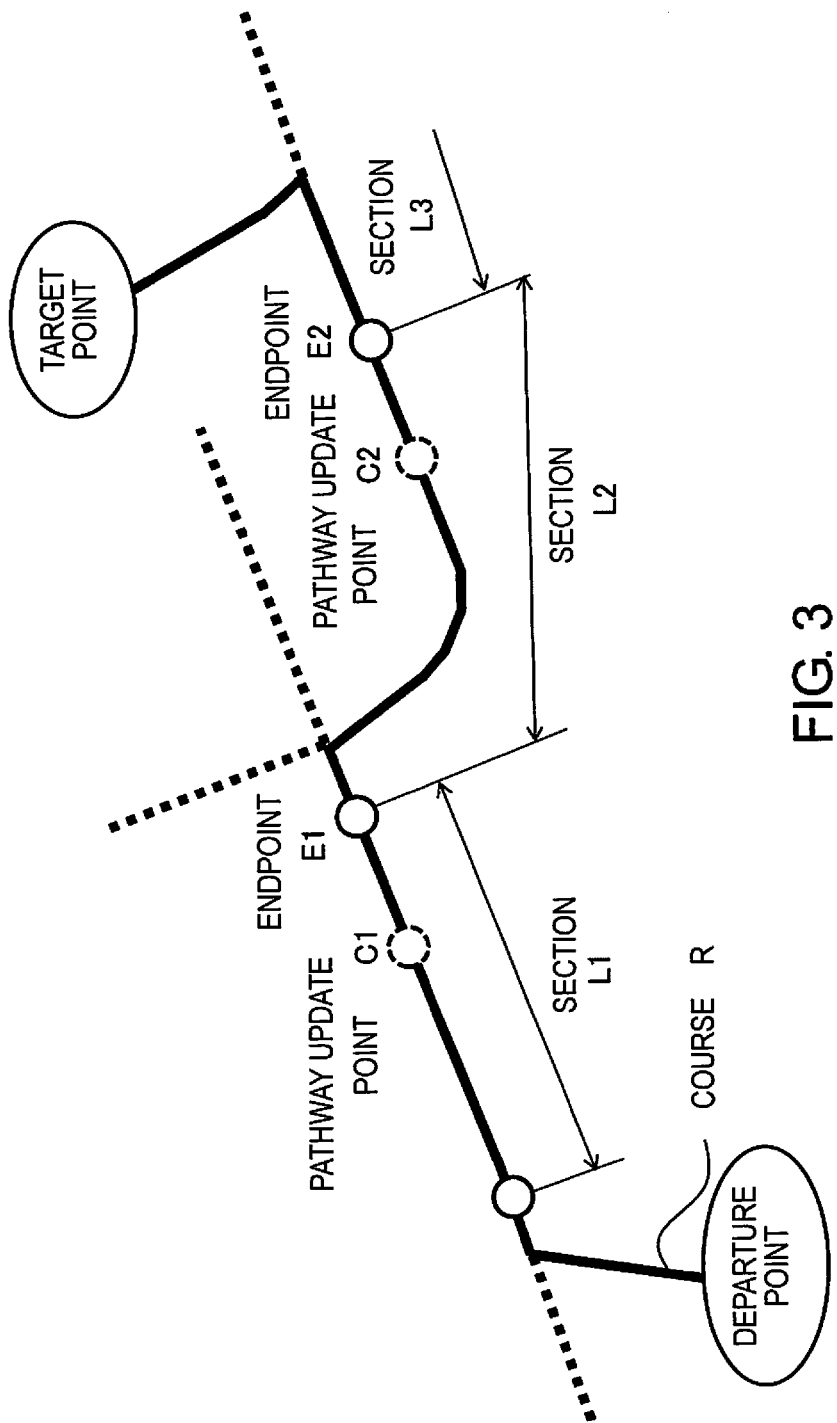
FIG. 3 is a schematic view describing the update of the target pathway.

The target pathway generating ECU 12 acquires map information and a course from a departure point to a destination searched by the navigation system 24, calculates a target pathway that represents the driving trajectory of the vehicle and the behavior of the vehicle for each predetermined section that is set on the course, and updates the target pathway for each section. Specifically, the target pathway generating ECU 12 acquires map information together with a course R from a departure point to the destination searched by the navigation system 24, as illustrated in FIG. 3. Then, the target pathway generating ECU 12 divides the course R from the departure point to the destination into predetermined sections, and updates the target pathway for each section. In the present embodiment, for example, the sections are set by dividing the course R every 200 m. Of course, the method of dividing the sections is not limited to this distance, and can be a distance that is different from this distance. In addition, it is not necessary for the sections to be divided into the same distances, and the method of dividing can be changed as necessary. Some of the successive sections divided in this manner are indicated as section L0, section L1, section L2, section L3 . . . in FIG. 3.

In addition, a pathway update point for updating the target pathway is set in each of the sections. In FIG. 3, the pathway update points of sections L1 and L2 are respectively indicated as pathway update points C1 and C2. In the present embodiment, when a host vehicle passes a pathway update point of a section using a navigation system 24, or the like, the target pathway generating ECU 12 calculates the target pathway from the pathway update point to the endpoint of the following section, and updates the target pathway. In FIG. 3, for example, when the host vehicle passes the pathway update point C1 of section L1, the target pathway generating ECU 12 calculates target pathways from the pathway update point C1 to the endpoint E1 of section L1, and from the endpoint E1 of section L1 (origin point of section L2) to the endpoint E2 of section L2, and updates the target pathway that is currently being used with the newly calculated target pathway. The same updating of the target pathway is carried out in section L2 as well. Specifically, when the host vehicle passes the pathway update point C2 of section L2, the target pathway generating ECU 12 calculates target pathways from the pathway update point C2 to the endpoint E2 of section L2, and from the endpoint E2 of section L2 (origin point of section L3) to the endpoint of section L3, and updates the target pathway calculated at the pathway update point C1 of section L1 with the newly calculated target pathway. In the present embodiment, for example, the pathway update point is set to a position before the section endpoint by a predetermined distance (that is, a position at which the remaining distance of the section becomes a predetermined distance). For example, in the present embodiment, this predetermined distance is set to 50 m. Of course, the position of the pathway update point is not limited to this position, and can be position that is different from this position. In addition, the pathway update point can be set to a position at which the time remaining until the vehicle reaches the section endpoint becomes a predetermined time or less.

The present embodiment is characterized in that the target vehicle speed contained in the generated target pathway information is corrected as necessary, in order to reduce discomfort that is felt by the user.

Figure 4:
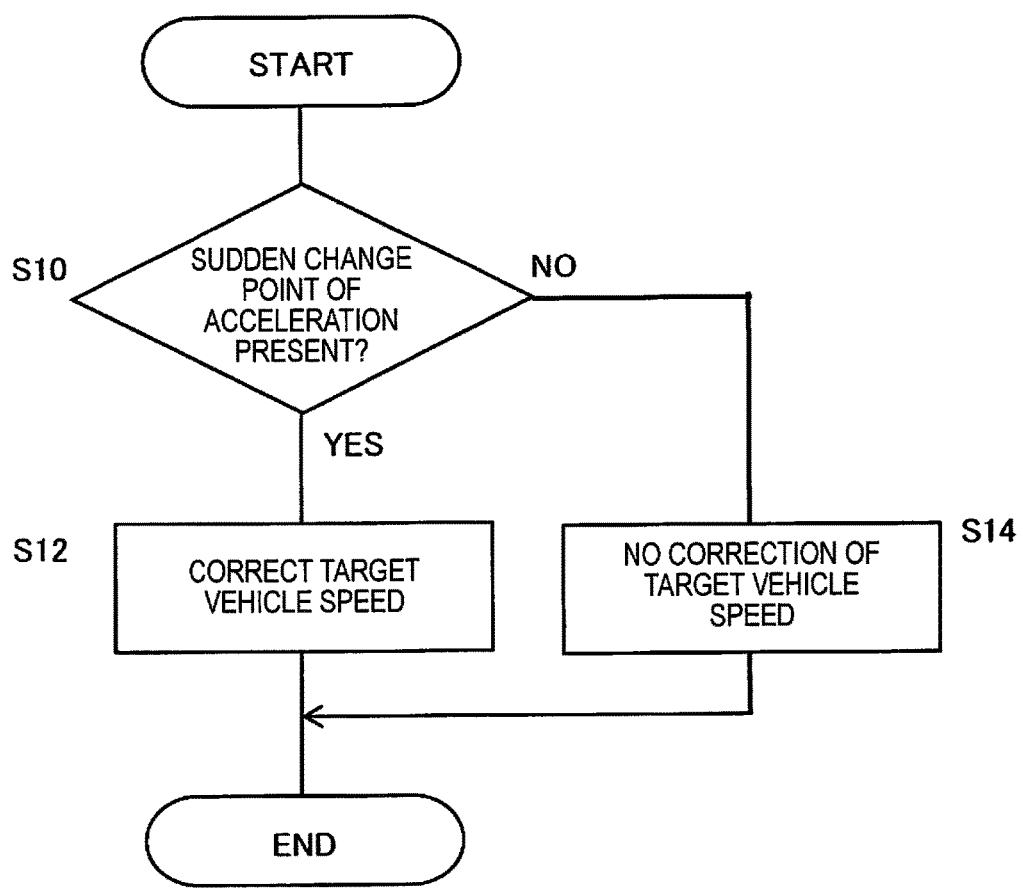
FIG. 4 is a flowchart describing the correction of the target vehicle speed according to the first embodiment.
Figure 5:
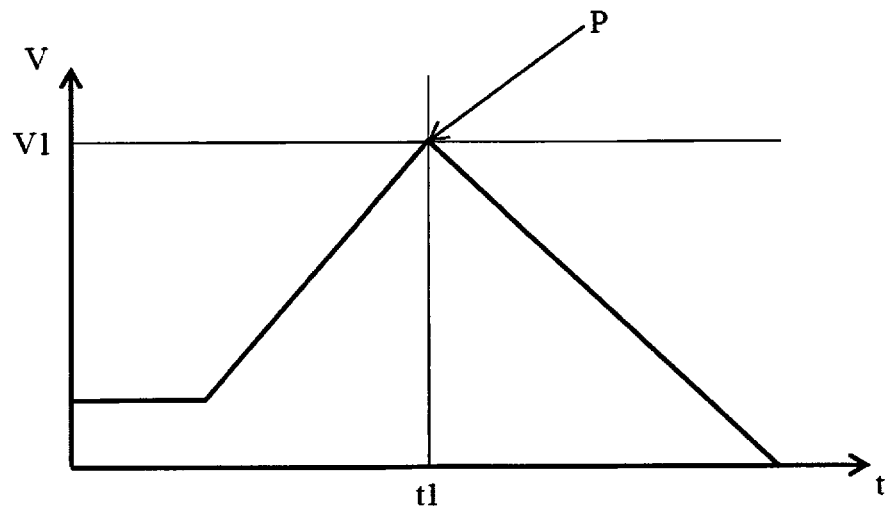
FIG. 5 is a graph describing the target vehicle speed before correction according to the first embodiment.
Figure 6:
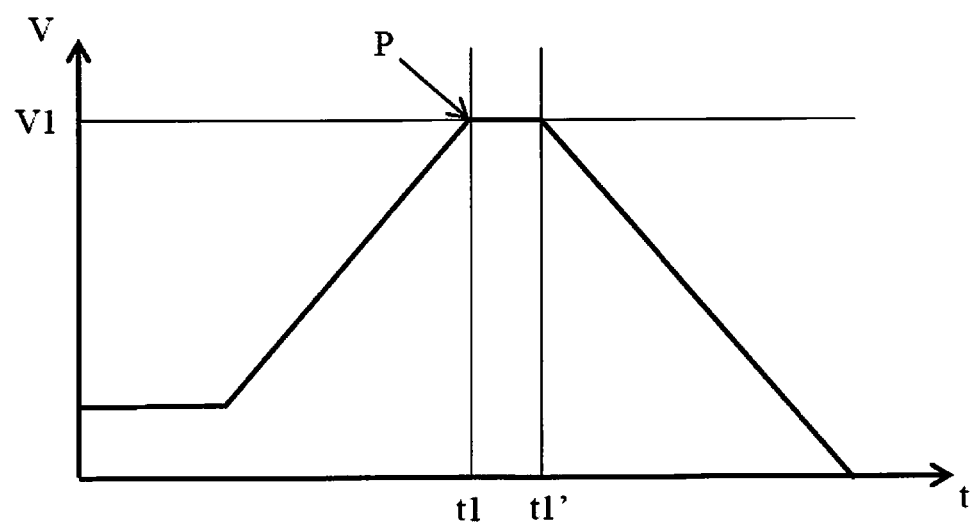
FIG. 6 is a graph describing the generation of a target vehicle speed after correction according to the first embodiment.
Figure 7:
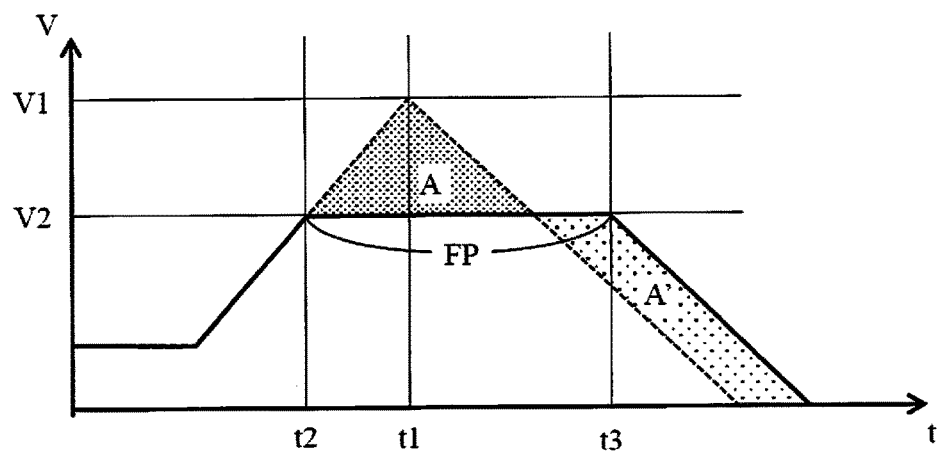
FIG. 7 is a graph describing the target vehicle speed before correction according to the first embodiment.
Figure 8:
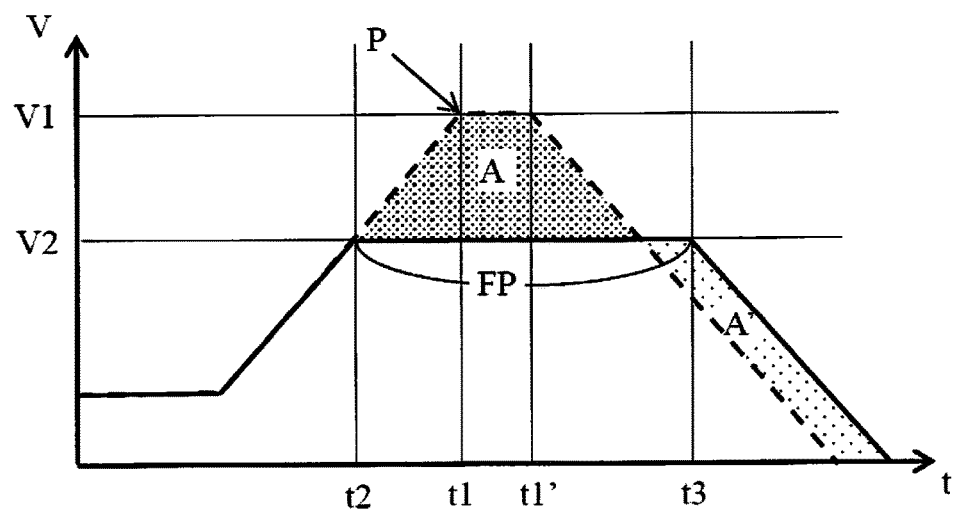
FIG. 8 is a graph describing the generation of a target vehicle speed after correction according to the first embodiment.

The correction of the target vehicle speed according to the present embodiment will be described using FIG. 4-FIG. 8. FIG. 4 is a flowchart describing the correction of the target vehicle speed according to the present embodiment. FIG. 5 and FIG. 6 are graphs describing the target vehicle speed before correction, and FIG. 7 and FIG. 8 are graphs describing the target vehicle speed after correction.

The operations of the sudden change point determination unit 30 (determination unit) and the target pathway calculation unit 32 (correction unit) of the target pathway generating ECU 12 according to the present embodiment will be described, with reference to the flowchart in FIG. 4. The flowchart of FIG. 4 is executed after the target pathway is updated at each of the pathway update points, as described above.

The sudden change point determination unit 30 determines whether or not a point at which there is a sudden change in the acceleration (that is, a point at which the acceleration changes in excess of a predetermined condition) is present in the generated target pathway (target vehicle speed) (Step S10). As an example of a predetermined condition that is used to determine the presence of a sudden change point in Step S10, a point at which the acceleration changes can be detected in a target vehicle speed pattern, and it can be determined that a predetermined condition has been exceeded when the ratio of the acceleration before the change to the acceleration after the change, when compared with a predetermined threshold value, is greater than the threshold value. Furthermore, for example, even when switching from acceleration to deceleration after an idle running period of constant speed driving, if the period of constant driving is less than a predetermined period (for example, three seconds), it can determine that a sudden change point is present. If the vehicle decelerates, the sign of acceleration becomes negative. A conceivable example of a case in which there is a sudden change in the acceleration is a case in which the acceleration of the target pathway increases due to an increase in the speed limit of the driving path, but it is necessary to carry out deceleration during the acceleration or immediately after the completion of acceleration, due to the presence of a stop point (signal, stop sign, or the like) or a point requiring deceleration (curved path, or the like) on the driving path thereafter. An example of the target speed in such a case is illustrated in the graph of FIG. 5. In FIG. 5, the vehicle continues acceleration until time t1 and the vehicle speed reaches V1, but the vehicle decelerates toward a stop from time t1. Therefore, the time chart of the target speed illustrated in FIG. 5 has a chevron shape with a pointed tip, having a sudden change of acceleration at point P. When such a sudden change of acceleration point P is present, the behavior of the vehicle is suddenly switched from acceleration to deceleration, so there is the fear of imparting discomfort to the user.

In addition, in FIG. 6, the vehicle continues acceleration until time t1 and the vehicle speed reaches V1; then, after a constant speed driving, the vehicle decelerates toward a stop from time t1'. A sudden change of acceleration point P is also present when the period of this constant speed driving (period from time t1 to time t1') is less than a predetermined period (for example, three seconds), and the behavior of the vehicle is suddenly switched from acceleration to deceleration, so there is the fear of imparting discomfort to the user. Therefore, in the present embodiment, it is also determined that a sudden change of acceleration point P is present when the idle running period between acceleration driving and deceleration driving is less than a predetermined period, as illustrated in FIG. 6.

That is, in the present embodiment, the sudden change point determination unit 30 determines that a sudden change point P is present when the constant speed driving period between acceleration driving and deceleration driving, or between deceleration driving and acceleration driving, is shorter than a predetermined period, when changing from acceleration driving to deceleration driving, or from deceleration driving to acceleration driving, in the target vehicle speed. That is, by determining that a sudden change point P is present, not only when the constant speed driving period between acceleration driving and deceleration driving is absent (when the constant speed driving period is 0), as illustrated in the time chart of FIG. 5, but also when the constant speed driving period is shorter than a predetermined period (for example, three seconds), as illustrated in the graph of FIG. 6, it is possible to reduce the chance that discomfort is imparted to the user, due to the behavior of the vehicle being switched relatively quickly.

Therefore, in the present embodiment, if the sudden change point determination unit 30 determines that a sudden change of acceleration point P is present on the target pathway (YES in Step S10), the target pathway calculation unit 32 corrects the target speed of the target pathway such that the sudden change point P is eliminated (Step S12). On the other hand, if the sudden change point determination unit 30 determines that a sudden change of acceleration point is not present on the target pathway (NO in Step S10), the target pathway calculation unit 32 ends the control flow illustrated in FIG. 4, without correcting the target speed of the target pathway (Step S14).

That is, the target vehicle speed generating device of a vehicle according to the present embodiment comprises a sudden change point determination unit 30 (determination unit) and a target pathway calculation unit 32 (correction unit). The sudden change point determination unit 30 determines whether or not a sudden change point, at which the acceleration changes suddenly, is present in the target vehicle speed contained in the target pathway information of the vehicle, which is set in advance. The target pathway calculation unit 32 corrects the target vehicle speed so as to eliminate the sudden change point, upon determining that a sudden change point is present by the sudden change point determination unit 30. Accordingly, it is possible to reduce discomfort that is felt by the user, which is caused by a sudden change in the behavior of the vehicle.

Specifically, in Step S12, the target pathway calculation unit 32 stops the acceleration at a timing that precedes the deceleration start point before correction, and corrects the target speed such that deceleration is started after providing a predetermined idle running period. In the graph of FIG. 7, the target speed illustrated in FIG. 5 has been corrected by the target pathway calculation unit 32. Additionally, in FIG. 8, the target speed illustrated in FIG. 6 has been corrected by the target pathway calculation unit 32. The target speed after correction is corrected such that acceleration is stopped at time t2, which is an earlier timing than time t1, and deceleration is started from time t3 to stop the vehicle, after carrying out a constant speed driving for a predetermined idle running period FP, at a vehicle speed V2, which is lower than the vehicle speed V1, as illustrated in FIG. 7 and FIG. 8. The target pathway calculation unit 32 sets t2 such that the area of portion A and the area of portion N in FIG. 7 are the same, to correct the target vehicle speed and provide a predetermined idle running period FP, such that the stop position of the vehicle will be the same as before and after the correction. By eliminating the sudden change point P and providing a predetermined idle running period FP in this manner, it is possible to smoothly transition from acceleration to deceleration, without imparting discomfort to the user. Furthermore, in the example of FIG. 8, t3 can be further provided such that the idle running period FP becomes a predetermined time or more (for example, three seconds), after which the target vehicle speed can be corrected such that the stop position and the acceleration will become appropriate values, in order to reduce the discomfort of the user.

That is, in the present embodiment, the target pathway calculation unit 32 corrects the target vehicle speed so as to eliminate the sudden change point P, by ending acceleration or deceleration at time t2 (second timing), which precedes time t1 (first timing) corresponding to the sudden change point P, upon determining that a sudden change point P is present by the sudden change point determination unit 30. By eliminating the sudden change point P and ending acceleration or deceleration at time t2, which is an earlier timing than time t1, in this manner, it is possible to smoothly transition from acceleration driving to deceleration driving, or, from deceleration driving to acceleration driving, without imparting discomfort to the user.

Additionally, in the present embodiment, the target pathway calculation unit 32 corrects the target vehicle speed so as to eliminate the sudden change point P, by starting a predetermined idle running period FP at time t2 (second timing), which precedes time t1 (first timing) corresponding to the sudden change point P, upon determining that a sudden change point P is present by the sudden change point determination unit 30. By eliminating the sudden change point P and providing a predetermined idle running period FP in this manner, it is possible to smoothly transition from acceleration driving to deceleration driving, or from deceleration driving to acceleration driving, without imparting discomfort to the user.

Furthermore, in the present embodiment, the sudden change point determination unit 30 determines whether or not there is a sudden change point P that changes from acceleration driving to deceleration driving in the target vehicle speed. The target pathway calculation unit 32 corrects the target vehicle speed so as to eliminate the sudden change point P, by ending acceleration at a point in time in which the vehicle speed of the vehicle reaches vehicle speed V2 (second vehicle speed), which is lower than the vehicle speed V1 (first vehicle speed), corresponding to the sudden change point P. By ending acceleration before the vehicle speed is increased, at a point in time in which the vehicle speed reaches vehicle speed V2, which is lower than vehicle speed V1, in this manner, it is possible to smoothly transition from acceleration driving to deceleration driving, without imparting discomfort to the user.

Furthermore, in the present embodiment, the sudden change point determination unit 30 determines whether or not there is a sudden change point P that changes from acceleration driving to deceleration driving in the target vehicle speed. The target pathway calculation unit 32 corrects the target vehicle speed so as to eliminate the sudden change point P, by starting deceleration driving after driving for a predetermined period at vehicle speed V2 (second vehicle speed), which is lower than vehicle speed V1 (first vehicle speed), corresponding to the sudden change point P. By eliminating the sudden change point P and driving for a period of time at vehicle speed V2, which is lower than vehicle speed V1, in this manner, it is possible to smoothly transition from acceleration driving to deceleration driving, without imparting discomfort to the user.

Here, the predetermined idle running period FP can be set to any appropriate value, for example three seconds. In addition, the predetermined idle running period FP can be set so as to change according to the acceleration and the vehicle speed.

That is, the target pathway calculation unit 32 can set the predetermined idle running period to be variable, in accordance with at least one of the vehicle speed and acceleration corresponding to the sudden change point P. For example, by setting the predetermined idle running period FP longer as the acceleration or the vehicle speed is increased, it is possible to smoothly transition to acceleration driving or deceleration driving with a sufficient margin, even when the acceleration or the vehicle speed is high.

Furthermore, the target pathway calculation unit 32 can set the time t2 (second timing) to be variable, in accordance with at least one of the vehicle speed and acceleration corresponding to the sudden change point P. Furthermore, the timing to start the idle running period FP (time t2) is preferably set to be an earlier timing, as the acceleration is increased. By setting the timing to start the idle running period FP to be earlier as the acceleration is increased in this manner, it is possible to start the idle running period FP before the vehicle speed becomes excessively high, and to smoothly transition to deceleration, even when the acceleration is large, and the vehicle speed will reach a high speed in a short period of time. In addition, in the examples of FIG.

7 and FIG. 8, acceleration is ended and constant speed driving at vehicle speed V2 is started at the timing of time t2; however, the acceleration can be reduced at the timing of time t2 such that a gentle acceleration driving, or a gentle deceleration driving, is carried out during the idle running period FP, or constant speed driving can be carried out until the end of the idle running period FP after driving at a small acceleration for a set period. That is, the vehicle speed control during the idle running period FP is not limited to constant speed driving, as long as the target vehicle speed is such that it is possible to eliminate the sudden change point P illustrated in FIG. 5 and FIG. 6, and to smoothly transition from acceleration to deceleration.

Examples are described in which the vehicle is ultimately stopped in FIG. 5 to FIG. 8, but the same control is also carried out when a deceleration request is output during acceleration or immediately after acceleration. An example of a case, in which a deceleration request is output during acceleration or immediately after acceleration, is a case in which a point that requires deceleration, such as a curve, is present after a point in which the speed limit of the driving path is increased.

As described above, in the driving control device according to the first embodiment, it is determined whether or not a point at which the acceleration is suddenly changed is present on the created target pathway of the vehicle, and if such a sudden change point is present, the target speed is corrected such that the sudden change point is eliminated, and deceleration is started after a predetermined idle running period after acceleration. Therefore, it is possible to avoid imparting discomfort to the user, which is caused by a sudden change from acceleration to deceleration, or, from deceleration to acceleration.

Cases in which the vehicle is accelerating are described in FIG. 5 to FIG. 8 of the first embodiment; however, the correction of the target pathway according to the first embodiment can also be applied when the vehicle suddenly changes from deceleration to acceleration.

Second Embodiment

The driving control device 10 according to the second embodiment will be described, with further reference to FIG. 9 and FIG. 10.

In the second embodiment, configurations and steps that function in the same or similar manner as in the first embodiment are given the same reference symbols, and the descriptions thereof are omitted. The driving control device 10 according to the second embodiment (refer to FIG. 1) is configured such that, when a vehicle is autonomously driving by autonomous driving control, it becomes possible to smoothly switch from acceleration to deceleration by providing an idle running period for a predetermined period between acceleration driving and deceleration driving, if a deceleration instruction or a stop instruction is output during acceleration or immediately after acceleration.

Specifically, the driving control device 10 according to the second embodiment is configured such that it becomes possible to smoothly switch from acceleration to deceleration by providing an idle running period for a predetermined period between acceleration driving and deceleration driving, by controlling the sensing sensitivity (detection distance) of the radar 16 in accordance with the acceleration of the vehicle (refer to FIG. 1).

Figure 9:
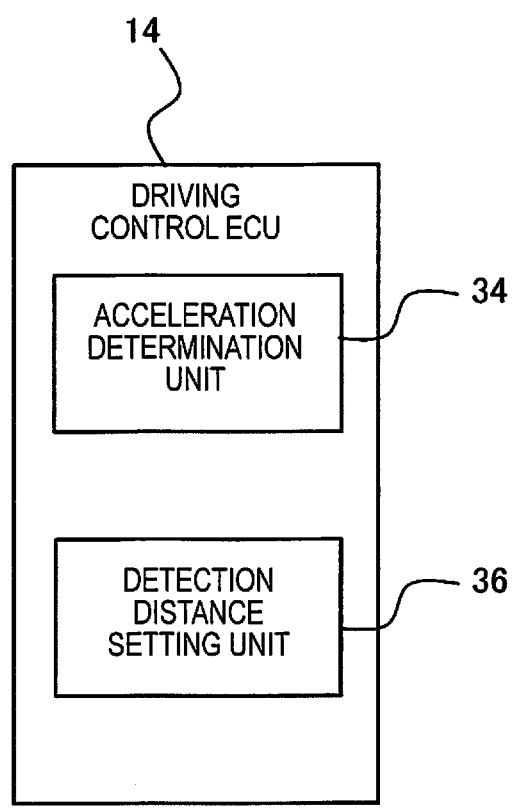
FIG. 9 is a block diagram illustrating the driving control ECU according to the second embodiment.

FIG. 9 is a block diagram illustrating the driving control ECU 14 according to the second embodiment. The driving control ECU 14 according to the second embodiment comprises an acceleration determination unit 34 that determines whether or not the acceleration of the vehicle is greater than a predetermined acceleration threshold value, and a detection distance setting unit 36 that increases the detection distance of the radar 16, upon determining that the acceleration of the vehicle is greater than the predetermined acceleration threshold value by the acceleration determination unit 34. In the second embodiment, the acceleration determination unit 34 further determines whether or not the speed of the vehicle is greater than a predetermined speed threshold value, and the detection distance setting unit 36 increases the detection distance of the radar 16, upon determining that the speed of the vehicle is greater than the predetermined speed threshold value.

Figure 10:
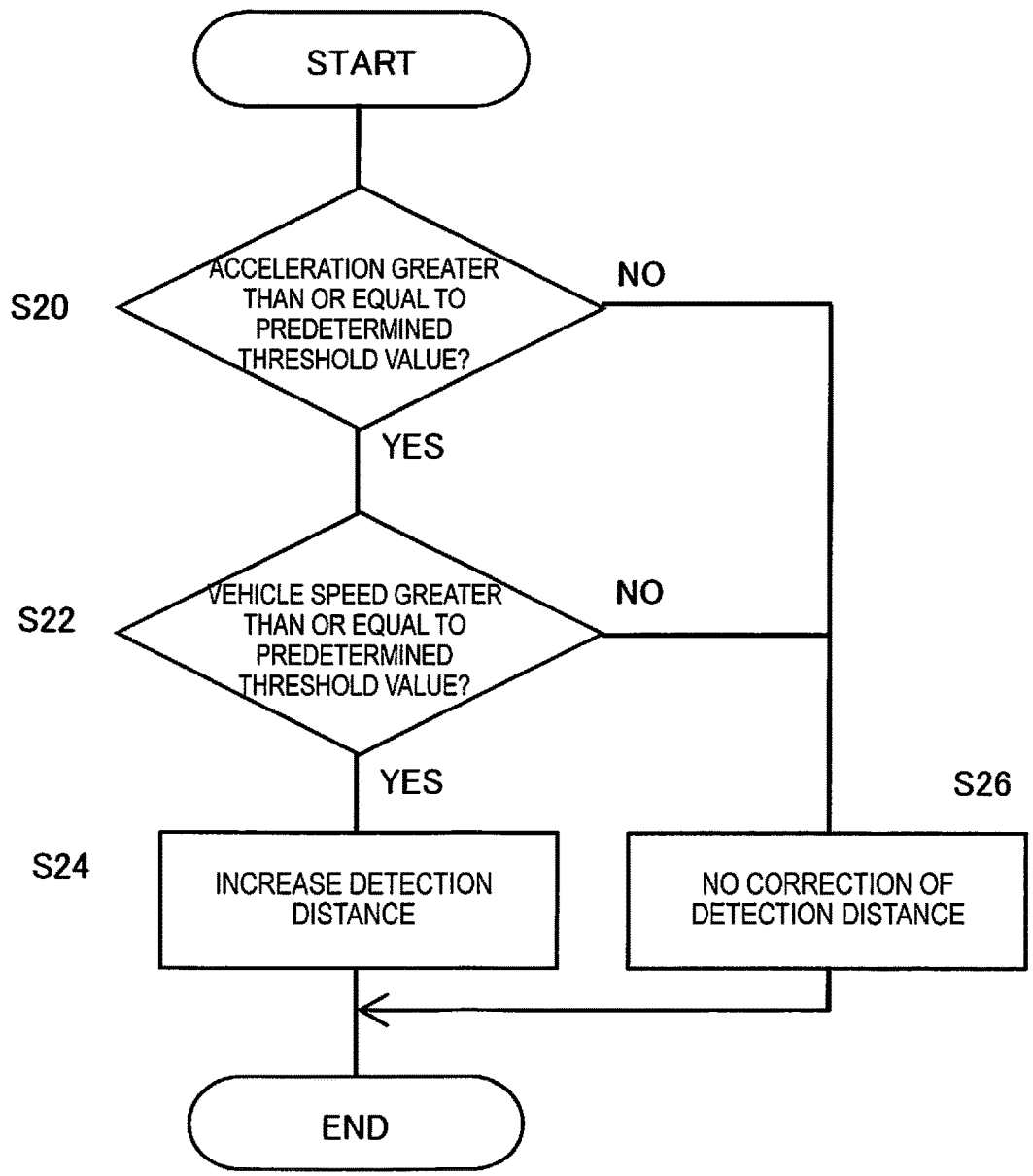
FIG. 10 is a flowchart describing the control of the radar detection distance according to a second embodiment.

FIG. 10 is a flowchart describing the control of the radar detection distance according to the second embodiment. The process indicated in the flowchart of FIG. 10 is repeatedly executed at predetermined intervals (for example, every 10-50 milliseconds), at the same time as starting the autonomous driving of the vehicle.

The acceleration determination unit 34 determines whether or not the acceleration of the vehicle exceeds a predetermined acceleration threshold value, from the detection result of the driving state detection sensor 20, during autonomous driving control of the vehicle (Step S20). If the acceleration exceeds the predetermined acceleration threshold value (YES in Step S20), next, it is determined whether or not the vehicle speed exceeds a predetermined vehicle speed threshold value (Step S22). If the vehicle speed exceeds the predetermined vehicle speed threshold value (YES in Step S22), it is determined that both acceleration and vehicle speed are high, and the detection distance of the radar (sensing sensitivity) is increased by the detection distance setting unit 36 (Step S24). On the other hand, if the acceleration is not greater than the predetermined threshold value (NO in Step S20), or if the vehicle speed is not greater than the predetermined threshold value (NO in Step S22), the control flow illustrated in FIG. 10 is ended, without correcting the detection distance of the radar 16 (Step S26).

That is, the driving control device of the present embodiment is a driving control device of a vehicle that has a distance measurement unit (for example a radar 16) that measures the distance to an object to be measured, comprising an acceleration determination unit 34 that determines whether or not the acceleration of the vehicle is greater than a predetermined acceleration threshold value, and a detection distance setting unit 36 that increases the detection distance of the distance measurement unit (for example the radar 16), upon determining that the acceleration of the vehicle is greater than the predetermined acceleration threshold value by the acceleration determination unit 34. Accordingly, it becomes possible to detect an object to be measured, such as a pedestrian or an obstacle, at an early timing, when the acceleration is high. Accordingly, it is possible to control the behavior of the vehicle (for example, stop the acceleration) at an earlier timing when an object to be measured is present, and to smoothly transition from acceleration to deceleration.

Furthermore, the acceleration determination unit 34 according to the present embodiment determines whether or not the speed of the vehicle is greater than a predetermined speed threshold value, and the detection distance setting unit 36 increases the detection distance of the distance measurement unit (for example, the radar 16), upon determining that the speed of the vehicle is greater than the predetermined speed threshold value. Therefore, it becomes possible to also detect an object to be measured, such as a pedestrian or an obstacle, at an early timing, when the speed of the vehicle is high. Accordingly, it is possible to control the behavior of the vehicle (for example, stop the acceleration) at an earlier timing when an object to be measured is present, and to smoothly transition from acceleration to deceleration.

Here, the increase in the detection distance by the detection distance setting unit 36 in Step S24 can be uniformly set to a predetermined detection distance, or can be variably set according to the value of the acceleration and/or the vehicle speed. For example, the detection distance of the radar 16 can be set to be greater, as the acceleration and/or the vehicle speed is increased. That is, the detection distance setting unit 36 can increase the detection distance as the acceleration of the vehicle and/or the speed of the vehicle is increased. By setting the detection distance of the radar 16 to be greater as the acceleration and/or the vehicle speed is increased in this manner, it becomes possible to detect an obstacle and start an idle running period FP before the vehicle speed becomes excessively high, even when the acceleration is high, and the vehicle speed will reach a high speed in a short period of time.

That is, by controlling the detection distance of the radar 16 to be increased as the acceleration and the vehicle speed are increased, it becomes possible to detect obstacles on the driving path at an earlier timing during acceleration than during non-acceleration, and it becomes possible to stop acceleration and provide an idle running period before the vehicle speed becomes high.

Here, the control of the second embodiment will be described using the graph of FIG. 7 of the first embodiment as an example. In FIG. 7, if the detection distance of the radar 16 is 100 m, and it is assumed that an obstacle, etc., that is 100 m ahead is detected at time t1 during acceleration, a vehicle stop instruction is output at time t1; therefore, acceleration is suddenly switched to deceleration at a sudden change point P corresponding to time t1. In this manner, if a sudden change point P is present, there is the risk that discomfort is imparted to the user.

Therefore, in the second embodiment, if the acceleration and vehicle speed become greater than their respective threshold values during autonomous driving control, the detection distance of the radar 16 is set to, for example, 150 m, which is greater than 100 m. Accordingly, it becomes possible to detect an obstacle, etc., at time t2, which is a timing that precedes time t1 of FIG. 7. Therefore, it is possible to stop acceleration at time t2, and to start deceleration from time t3 to stop the vehicle, after carrying out a constant speed driving for a predetermined idle running period FP, at a vehicle speed V2, which is lower than the vehicle speed V1. Accordingly, it is possible to smoothly transition from acceleration to deceleration. Here, the predetermined idle running period FP can be set to any appropriate value, for example three seconds. In addition, the predetermined idle running period FP can be set so as to change according to the acceleration and the vehicle speed. Additionally, the vehicle speed control during the predetermined period FP is not limited to a constant speed driving, in the same manner as the first embodiment. Furthermore, an example is described in which the vehicle is ultimately stopped in FIG. 7, but the same control is also carried out when a deceleration request is output during acceleration or immediately after acceleration. An example of a case, in which a deceleration request is output during acceleration or immediately after acceleration, is a case in which the host vehicle accelerates and approaches a preceding vehicle, in a preceding vehicle following control.

Meanwhile, both the control relating to the setting of a target speed when generating a target pathway according to the first embodiment, and the control of the detection distance of the radar 16 during autonomous driving control according to the second embodiment, can be carried out as well. In this case, the driving control device comprises an acceleration determination unit 34 that determines whether or not the acceleration of the vehicle is greater than a predetermined acceleration threshold value, and a detection distance setting unit 36 that increases the detection distance of the distance measurement unit (for example, the radar 16), upon determining that the acceleration of the vehicle is greater than the predetermined acceleration threshold value by the acceleration determination unit 34, and is further provided with a target vehicle speed generating device, comprising a sudden change point determination unit 30 (determination unit) that determines whether or not a sudden change point P at which there is a sudden change in the acceleration is present in the target vehicle speed contained in the target pathway information of the vehicle, which is set in advance, and a target pathway calculation unit 32 (correction unit) that corrects the target vehicle speed such that the sudden change point P is eliminated, if the sudden change point determination unit 30 determines that a sudden change point P is present. Accordingly, it becomes possible to further reduce the frequency of occurrence of a driving pattern in which a sudden change point P of acceleration is present, and to reliably avoid imparting discomfort to the user.

In the first and second embodiments described above, autonomous driving control is carried out by the driving control ECU 14; however, the generation of a target pathway of the present application can be used even if a fully autonomous driving control is not carried out, or even when an autonomous driving control is not carried out at all. For example, the target pathway generated by the target pathway generating ECU 12 can be simply notified to the driver, or the driving conditions for achieving the generated target pathway can be notified to the user. In these cases, driving support for supporting the driving of the user (driver) will be carried out instead of an autonomous driving control. In addition, even if a fully autonomous driving control is not carried out, driving assistance can be carried out, such as carrying out only acceleration/deceleration or only steering by the driving control device 10.

The invention claimed is:

1. A target vehicle speed generating device of a vehicle, the target vehicle speed generating device comprising:
   a determination unit configured to determine whether or not a sudden change point is present in a target vehicle speed contained in a target pathway information of the vehicle, the sudden change point being a point at which acceleration changes in excess of a predetermined condition which is set in advance; and
   a correction unit configured to correct the target vehicle speed so as to eliminate the sudden change point, upon determining that the sudden change point is present by the determination unit.

2. The target vehicle speed generating device according to claim 1, wherein
   the correction unit is further configured to correct the target vehicle speed so as to eliminate the sudden change point by ending acceleration or deceleration at a second timing, which precedes a first timing corresponding to the sudden change point upon determining that a sudden change point is present by the determination unit.

3. The target vehicle speed generating device according to claim 2, wherein
the correction unit is further configured to set a predetermined idle running period in accordance with at least one of the vehicle speed and acceleration corresponding to the sudden change point.

4. The target vehicle speed generating device according to claim 2, wherein
the correction unit is further configured to set the second timing in accordance with at least one of the vehicle speed and acceleration corresponding to the sudden change point.

5. The target vehicle speed generating device according to claim 1, wherein
the correction unit is further configured to correct the target vehicle speed so as to eliminate the sudden change point by starting a predetermined idle running period from a second timing, which precedes a first timing corresponding to the sudden change point, upon determining that the sudden change point is present by the determination unit.

6. The target vehicle speed generating device according to claim 1, wherein
the determination unit is configured to determine whether or not there is a sudden change point that changes from acceleration driving to deceleration driving in the target vehicle speed; and
the correction unit is further configured to correct the target vehicle speed so as to eliminate the sudden change point by ending acceleration at a point in time in which the vehicle speed of the vehicle reaches a second vehicle speed, which is lower than a first vehicle speed corresponding to the sudden change point.

7. The target vehicle speed generating device according to claim 1, wherein
the determination unit is configured to determine whether or not there is a sudden change point that changes from acceleration driving to deceleration driving in the target vehicle speed; and
the correction unit is further configured to correct the target vehicle speed so as to eliminate the sudden change point, by starting deceleration after driving for a predetermined period at a second vehicle speed, which is lower than a first vehicle speed corresponding to the sudden change point.

8. The target vehicle speed generating device according to claim 1, wherein
the determination unit configured to determine the sudden change point is present when a constant speed driving period between acceleration driving and deceleration driving, or between deceleration driving and acceleration driving, is shorter than a predetermined period, when changing from acceleration driving to deceleration driving, or from deceleration driving to acceleration driving, in the target vehicle speed.

9. A driving control device of a vehicle having a distance measurement unit that measures the distance to an object to be measured, the driving control device comprising:
an acceleration determination unit configured to determine whether or not acceleration of the vehicle is greater than a predetermined acceleration threshold value; and
a detection distance setting unit configured to increase a detection distance of the distance measurement unit upon determining that the acceleration of the vehicle is greater than the predetermined acceleration threshold value by the acceleration determination unit.

10. The driving control device according to claim 9, wherein
the acceleration determination unit is further configured to determine whether or not a speed of a vehicle is greater than a predetermined speed threshold value; and
the detection distance setting unit is further configured to increase the detection distance of the distance measurement unit upon determining the speed of the vehicle is greater than the predetermined speed threshold value.

11. The driving control device according to claim 9, wherein
the detection distance setting unit is further configured to increase the detection distance as the acceleration of the vehicle is increased.

12. The driving control device according to claim 9, wherein
the detection distance setting unit is further configured to increase the detection distance as acceleration of the vehicle or speed of the vehicle is increased.

13. The driving control device according to claim 9, further comprising
a target vehicle speed generating device comprising:
a determination unit configured to determine whether or not a sudden change point is present in a target vehicle speed contained in a target pathway information of the vehicle, the sudden change point being a point at which acceleration changes in excess of a predetermined condition which is set in advance; and,
a correction unit configured to correct the target vehicle speed so as to eliminate the sudden change point upon determining that the sudden change point is present by the determination unit.

* * * * *